INVENTOR
LEE A. STENSAKER
BY Dressler, Goldsmith, Clement & Gorton
ATTORNEYS

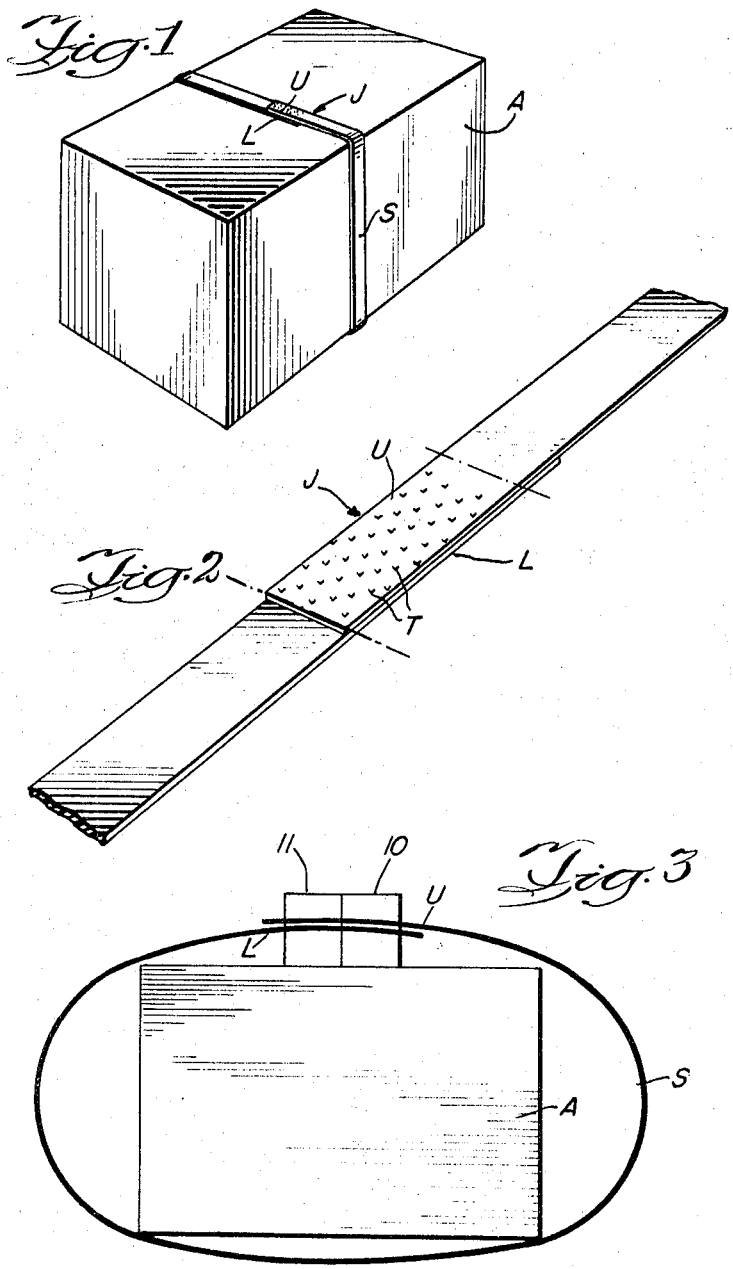

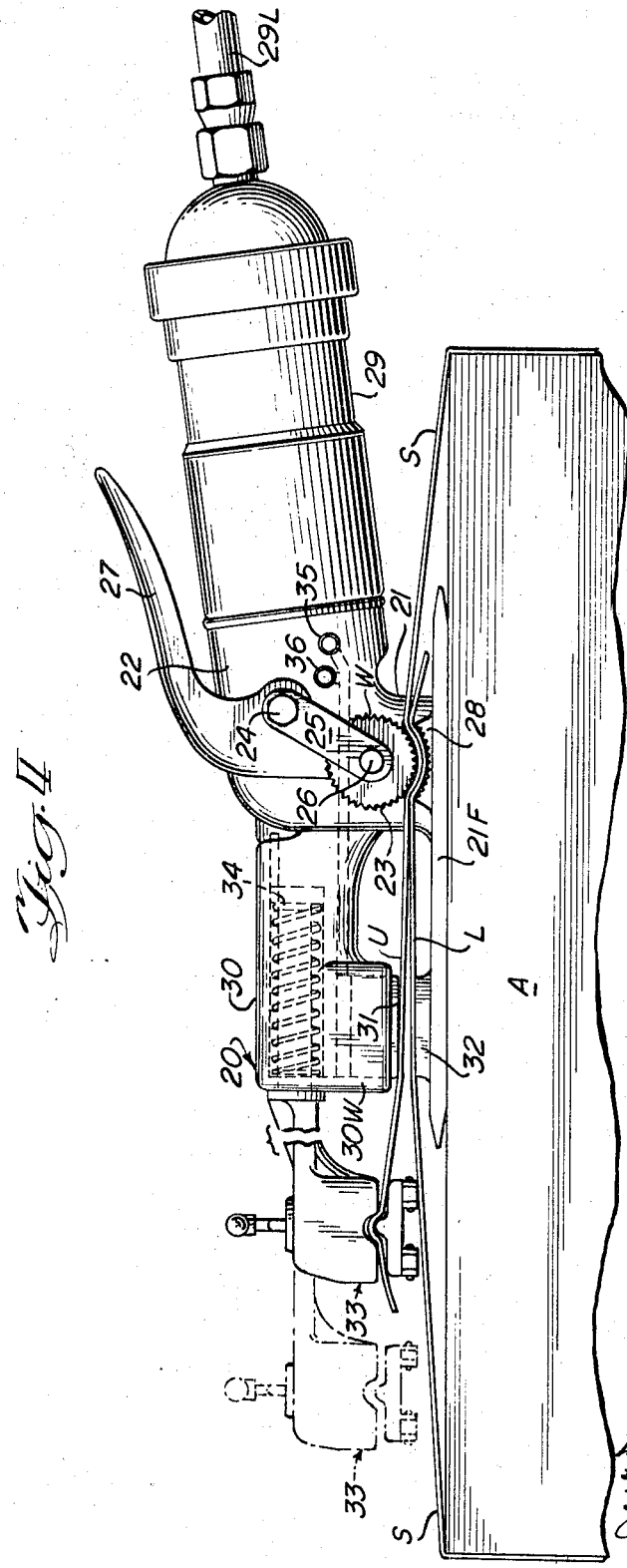

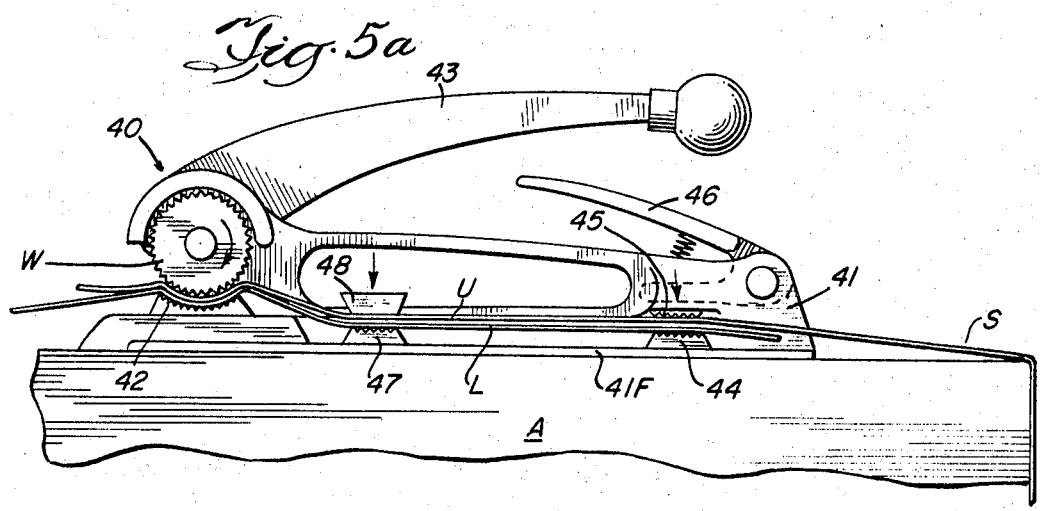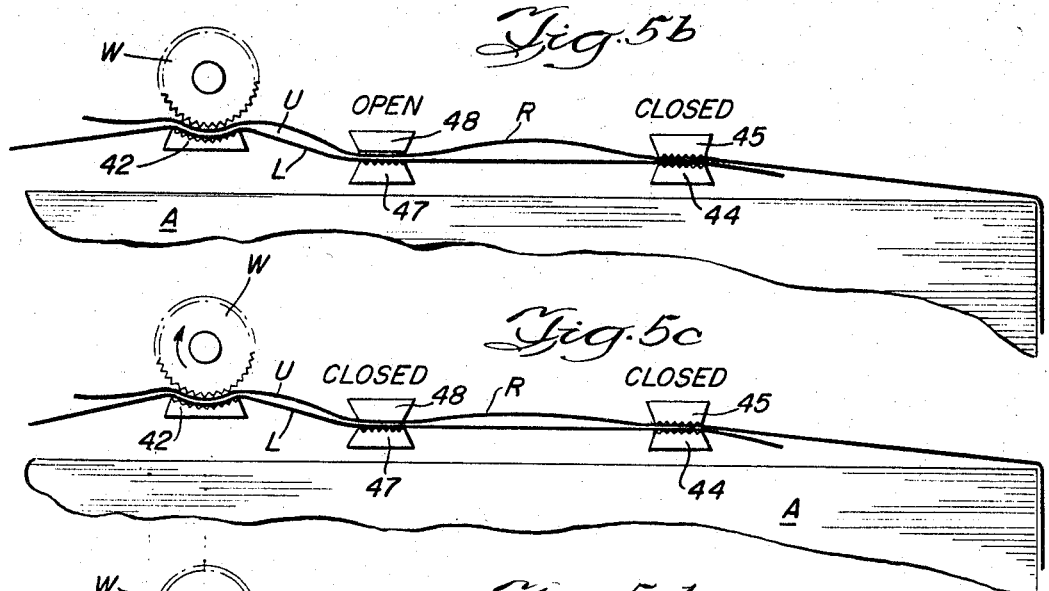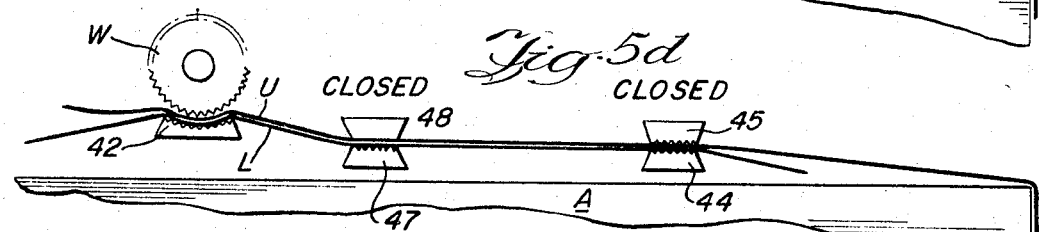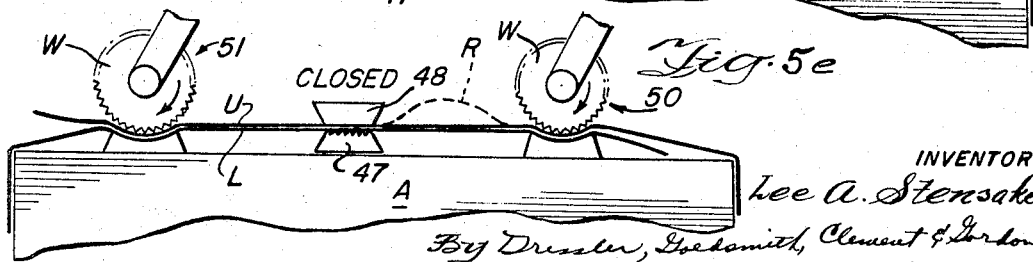

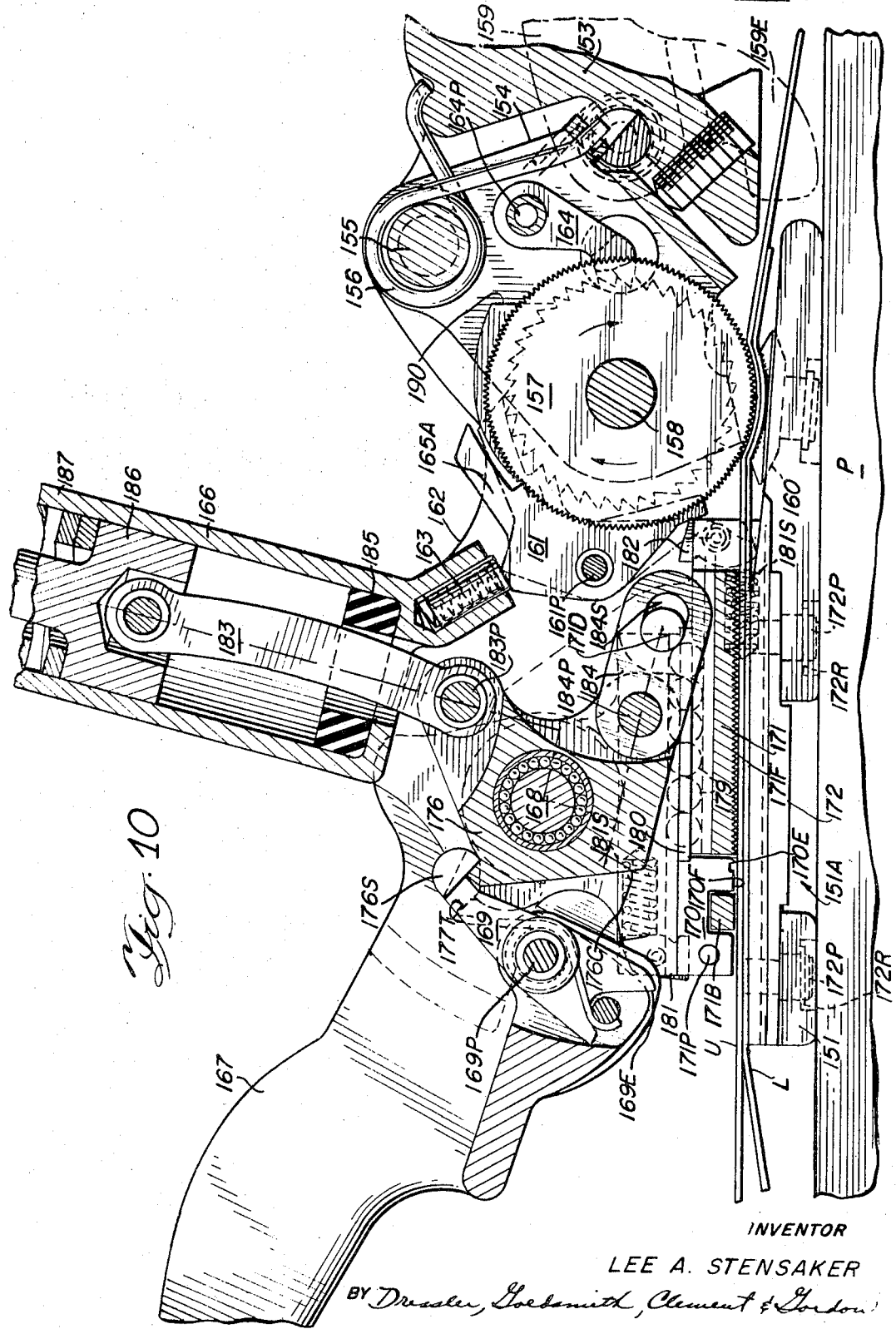

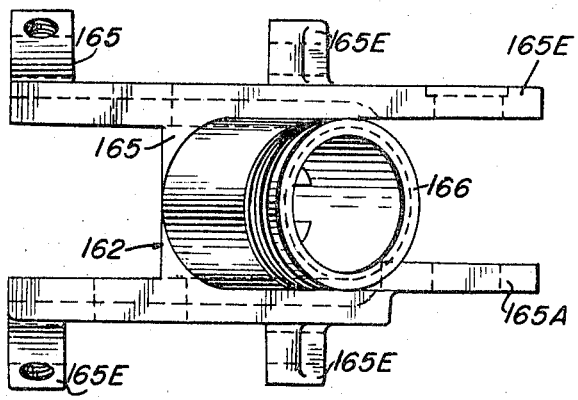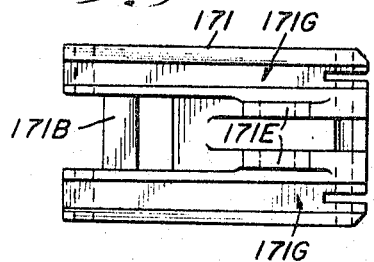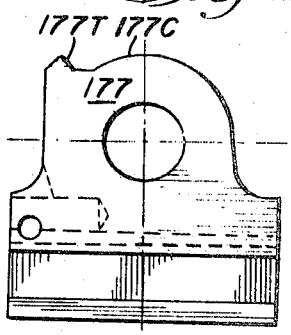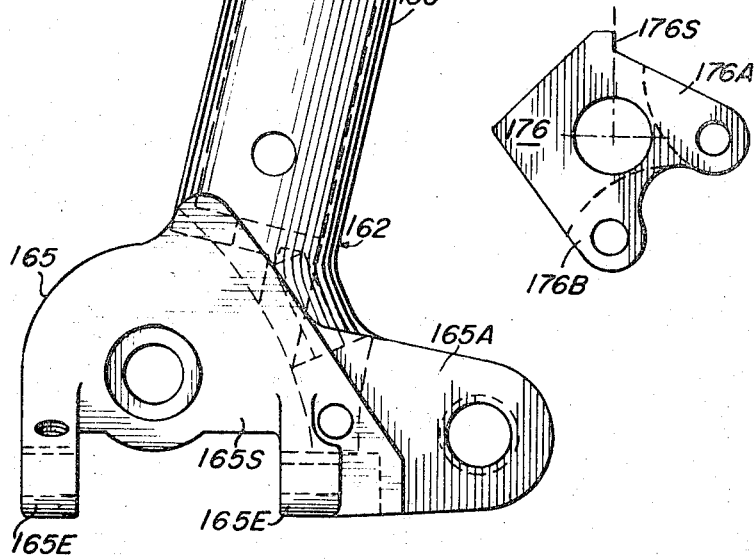

United States Patent Office 3,442,735
Patented May 6, 1969

3,442,735
FRICTION-FUSION STRAP SEALING
Lee A. Stensaker, Streamwood, Ill., assignor to Signode Corporation, a corporation of Delaware
Continuation-in-part of application Ser. No. 472,587, July 16, 1965. This application Feb. 2, 1966, Ser. No. 524,432
Int. Cl. B32b *31/20;* B30b *3/02;* B65b *13/32*
U.S. Cl. 156—73          10 Claims

ABSTRACT OF THE DISCLOSURE

A method and apparatus for providing a ligature about an article including providing a length of thermoplastic strap having a tensioned loop and overlapping end portions. The end portions of the length of strap are first compressed and then moved relative to one another to effect interface melting between the overlapping end portions. The joint is finally formed by maintaining the interface regions in fusing contact until solidification is effected.

Cross reference to related application

This application is filed as a continuation-in-part of a copending application Ser. No. 472,587 filed July 16, 1965, now abandoned.

Background of the invention

This invention relates to a method and apparatus for forming a ligature of thermoplastic strap material in binding engagement about an article or package to be tied. In general, the invention is concerned with forming thermoplastic strap material into a loop that encircles an article so that the loop is provided with overlapping strap portions and maintaining the loop about the article while effecting melting and solidification substantially only at the interface therebetween to unify the same.

More particularly, the invention provides for maintaining the loop about the article while effecting bodily sliding frictional movement between contacting surface regions of the overlapping strap portions until interface melting occurs and then compressing the overlapping strap portions together to hold the melted surface regions in stationary fusing contact to achieve interface solidification and unification of the overlapping strap portions.

Steel strapping has long been used for tying and packaging operations of all types. Many arrangements have been employed for sealing the ends of steel strapping including various types of connectors, wrap-around seals, and various types of sealess or shear lock joints. The basic approach has always been to establish a loop about an article, shrink the loop into article binding engagement and then, with opposite ends fixed in overlapped and aligned relation, effecting a seal to lock the strap ends together.

Plastic strapping entered the tying and packaging field at a much later date and gradually has become more important. There are many applications for which plastic strapping is uniquely suited, particularly where the strength of steel is not required. For example, plastic strap, being more elastic is more readily stretchable than steel strap and is ideal for tying packages subject to expansion and contraction and for tying packages subject to handling conditions that impose substantial shock loading upon the strap loop. There are many old applications and a growing number of new applications where the strength of steel is not required. Moreover, plastic strapping is continually being improved in strength. For example, currently available linearly oriented plastic strapping of nylon or polypropylene offers substantially greater tensile strength than the plastic strapping originally introduced some years ago.

Factors which have promoted increased usage of plastic strap are its greater flexibility and elasticity and its lower cost. Another advantage with plastic strapping is ease of disposal.

In the development of the plastic strap art, the general approach to sealing, as developed and refined for steel strapping, has been widely explored. The approach thus has been to form and shrink a loop and, while holding the opposite ends aligned and stationary, to effect a complete seal by applying a wrap around seal in a fashion analogous to that used for steel strap. The grip of a wrap around seal depends upon effecting a mechanical interlock by upsetting or crimping the strap and the seal.

Wrap around seals have not proven to be completely effective, the weakness of the plastic strapping in shear limits the crimping and interlocking techniques normally employed with wrap around seals. Nevertheless many special forms of wrap around seals have been employed. In addition, strap buckles of various types have been used for many manual strapping environments.

Because of the acknowledged deficiencies with mechanical interlock connections for plastic strapping, other workers have explored a number of stationary joinder operations for melting and fusing overlapping portions of thermoplastic strap. Heated pressure jaws have been applied to overlapping strap sections to soften the entire cross section thereof and produce melting and fusion but objectionable effects are introduced changing the character and strength of the strap. Other stationary joinder operations include high frequency dielectric heating and ultrasonic vibration heating. The heating effects produced by these approaches are not desirable although greater control is made possible. Finally, a hot knife technique has been employed wherein a heated element is interposed between the overlapping strap sections to contact and melt the interface surface regions of the strap in preparation for fusion upon removal of the heated element.

Even the more efficient bodily heating approaches such as the hot knife and the high frequency techniques fail to localize the heat input to the actual surface regions which are to be softened or melted leading to inefficiencies and higher costs and, more importantly, leading to alteration of the characteristics of the plastic material at the joint. In addition, the basic equipment costs for these systems in many instances preclude their use.

Summary of the invention

The present invention utilizes bodily sliding frictional movement for effecting a seal between overlapping thermoplastic strap portions at opposite ends of a strap loop while the loop is maintained about an article that is to be tied. While this approach is a frank departure from that which is indicated by the entire history and evolution of the strapping field it offers the best solution to the problem of sealing a loop of plastic strap into an article binding ligature. The present approach has led to greatly improved total results in terms of joint strength, joint reliability and uniformity, efficiency, speed and ease of fabrication, simplicity of tooling, lower equipment cost, adaptability to both manual and automatic systems and ease of maintenance.

The required strap movement involved in the principal embodiments of the present invention and required to be carried out in the environment of an article encircling strap loop has obscured the present solution, but techniques and configurations disclosed herein have proven feasible for providing controlled bodily sliding frictional movement between compressed overlapping strap portions at opposite ends of a tensioned loop. In some respects, the physical characteristics which have made plastic strapping a problem to seal in the form of an article binding ligature, also make plastic strapping compatible with the requirements for producing bodily sliding movement. The flexibility, strain rate, and surface slipping characteristics of plastic strapping are mentioned in this regard.

Another apparent deterrent to the development of the present technique arises because of its dependence upon heat of fusion, and the deleterious effects of heat on plastic strapping are known and in fact have been demonstrated in the earlier bodily heating approaches. The heat problem is easily controlled in the practice of the present invention. It is to be noted that frictional generation of heat is a function of pressure so that friction and melting occur at regions which necessarily are simultaneously subjected to pressure. When broad area pressure distribution is employed, the surface melted regions resulting from bodily sliding frictional movement are actively worked and stressed and, upon solidification, exhibit the strength properties desired in the strapping material. The broad area pressure distribution determines the size and shape of the joint interface layer. This joint interface layer assumes a convenient size in actual practice and optimum strength can be achieved without excessive joint length, a very important factor in tooling and apparatus arrangements utilized in the practice of the invention.

While substantial pressure is an important factor in the development of frictional generation of the heat of fusion, the instantaneous value of the pressure is not narrowly critical and may in fact vary appreciably during the actual movement phase without significantly varying the melting and fusion effect.

Some of the advantages of the technique of generating fusion heat by bodily sliding frictional movement are that the heat is concentrated at the surfaces to be joined, the adjacent strap material is not deleteriously affected by the heat, large surfaced and broad distribution of heat and surface melting is readily and accurately achieved, the heat energy generated at the surface is effected in the presence of pressure distributed broadly so that the melting may be only a surface softening effect. The ultimate joint is effectively strong in tension but lends itself to easy stripping when desired.

A number of effective approaches based upon creating bodily sliding frictional movement in an article binding tensioned loop environment have now been devised based on the concepts of this invention. Some use a simple one way movement of a strap end associated with a tensioned loop. Others use an oscillating or reciprocating movement of a strap end associated with a tensioned loop. The controlled bodily sliding movement is carried out in the presence of substantial pressure. When the controlled bodily sliding movement is terminated, the melted surfaces are held in stationary broad area contact and compressed together so that loop tension does not interfere with initial interface solidification. The invention is also applicable to form and close loops which may loosely encircle an article.

Other features and advantages of the invention will be apparent from the following description and claims and are illustrated in the accompanying drawings which show structure embodying preferred features of the present invention and the principles thereof, and what is now considered to be the best mode in which to apply these principles.

Brief description of the drawings

In the accompanying drawings forming a part of the specification, and in which like numerals are employed to designate like parts throughout the same:

FIG. 1 is a perspective view of an article bound by a thermoplastic ligature produced in accordance with the practice of this invention;

FIG. 2 is an enlarged perspective view of a fused ligature joint formed by one of the disclosed techniques for utilizing bodily sliding frictional movement between overlapping strap portions;

FIG. 3 is a diagrammatic elevational view illustrating a strap loop loosely encircling an article to be tied, with overlapping strap portions at opposite ends of the loop disposed across the top of the article and threaded through tensioning and sealing facilities represented by functional block type elements;

FIG. 4 is a diagrammatic side elevational view illustrating a tool embodiment for performing one of the method techniques of the present invention;

FIG. 5a is a diagrammatic side elevational view of another tool embodiment for performing another of the method techniques of this invention;

FIGS. 5b–5d are schematic sequential views illustrating various stages in the operation of the tool of FIG. 5a;

FIG. 5e schematically illustrates a related arrangement;

FIG. 10 is a related lengthwise sectional view through the sealer showing the parts cocked and ready for the power stroke;

FIG. 11 is an exploded elevational view of a bell crank and a shoe support utilized in the sealer;

FIG. 12 is a plan view of the sealer shoe;

FIG. 13 is an elevational view of the sealer frame; and

FIG. 14 is a plan view of the sealer frame.

Description of the preferred embodiment

Figure 6:
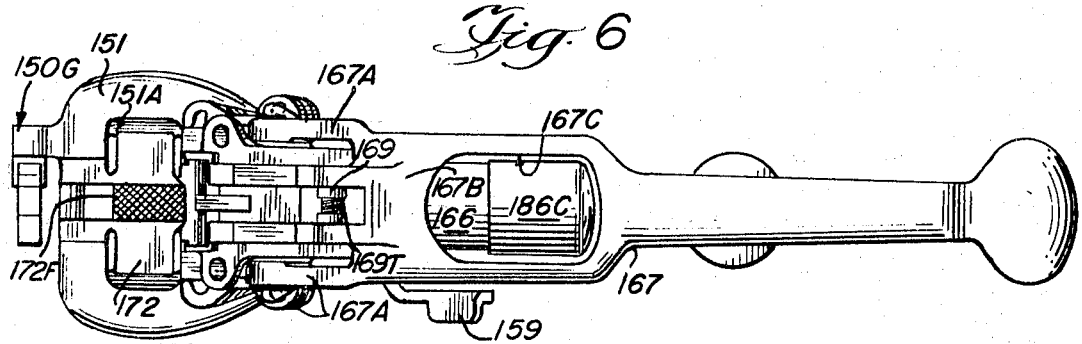
FIG. 6 is a plan view of a manual type combination strap tensioning and sealing tool utilizing the principles of this invention.

Referring now to the drawings, a completed package is illustrated in FIG. 1, wherein a ligature of thermoplastic strap material is shown encircling an article A in binding engagement thereabout. The ligature consists of a loop of thermoplastic strap S having overlapping strap sections U and L defining a loop closure region characterized by a unique friction fused joint J. The fused joint is characterized by broad area contact between interface regions of the strap sections U and L and it is shown in enlarged form in FIG. 2, wherein the end limits of the actual area of interface merger are depicted in phantom lines.

The friction-fused joint produced in accordance with this invention is between the major interface surface area regions of the strap sections U and L, and is localized to the surface to avoid impairment of the orientation properties of the deeper or interior strap regions. Friction-fused joints produced by the practice of this invention are readily controllable to consistently exhibit a strength of about 60 to 90% of the strap tensile strength. For plastic strapping of nylon or polypropylene in ½ inch width and in typical thicknesses such as 0.015 inch to .065 inch, the length of the joint area characteristically has been from about one inch to two inches although joint lengths of other dimensions may be provided if desirable.

In the practice of the present invention, a ligature is provided in binding engagement about the article by forming a length of thermoplastic strap into a strap loop encircling the article so that the loop is provided with overlapping strap portions defining a loop closure region. The loop is maintained about the article while effecting mutual interface melting and solidification of the overlapping strap portions U and L. Broad area surface melting is effected concurrently at each of the opposing interface surface regions by effecting controlled bodily sliding frictional movement in the presence of substantial pressure while simultaneously maintaining the loop in article binding engagement. The melted surface regions of the overlapping strap portions are held compressed together under substantial pressure to hold the same in stationary fusing contact to achieve interface solidification and unification of the strap portions.

The present disclosure presents a variety of techniques for achieving controlled bodily sliding frictional movement against each overlapping strap interface surface, while the same is associated with a strapping environment wherein the strap loop is maintained about the article. These techniques originated with one-way travel arrangements, and certain types of these are illustrated in FIGS. 4 and 5. Another unique one-way travel arrangement utilizing the principles of this invention is illustrated in Ericsson application Ser. No. 524,431 filed of even date. Various forms of multidirectional travel arrangements have now also been devised and are illustrated in a Stensaker et al. application Ser. No. 479,446, filed Aug. 13, 1965, and in Vilcins application Ser. No. 524,429 filed of even date.

Referring now to FIG. 3 a functional block diagram representation is there illustrated wherein a strap loop S is shown loosely encircling the article A which is to be tied. The strap portions U and L at the opposite end of the loop are in overlapping contacting relation to each other across the top of the article A. These strap portions U and L are shown threaded through functional block elements designated 10 and 11. In the particular strap loop configuration illustrated in FIG. 3 the lower overlapping strap portion L is a free strap end while the upper overlapping strap portion U leads from a payout reel (not shown) and normally is cut off only after tensioning and sealing of the strap loop is completed.

The tool embodiments represented in the drawings may be classified in relation to the functional block diagram illustration of FIG. 3. Thus, in FIG. 4 the tensioning facilities have the same relationship to the strap loop as the functional block element 10 and the sealing facilities have the same relationship to the strap loop as the functional block element 11; whereas in FIG. 5 the tensioning facilities have the same relationship to the strap loop as does functional block element 11 while the sealing facilities have the relationship of block element 10. It may also be seen from this classification, that the tool embodiments, illustrated in the aforesaid Vilcins and Stensaker et al. applications fall within the same category as the embodiment of FIG. 4. The Ericsson embodiment is illustrated herein beginning with FIG. 6 and is also in the same category as that illustrated in FIG. 4.

For the joint illustrated in FIG. 2 teeth marks T are represented on the exposed face of the upper strap portion U. This corresponds to strap joints such as would be formed by the tool embodiments illustrated in the aforesaid Ericsson and Vilcins applications. In devices of this type a movable pressure jaw engages a strap portion to move the strap portion with it in effecting controlled bodily sliding frictional movement. Teeth or roughened configurations on the movable jaw are utilized in such arrangements. No teeth marks would appear on the upper strap portion with tool embodiments such as are shown in FIGS. 4 and 5 herein, as these arrangements depend upon movement of the upper strap portion with respect to its pressure jaw. In this situation the jaw face should allow the desired movement in the presence of substantial pressure.

Referring now to FIG. 4, one illustrative embodiment of the invention as shown therein, comprises a combination power tool designated generally at 20, which is shown seated upon an article A, with a loop of strap S snugly encircling the article and having overlapping upper and lower strap portions U and L threaded through the tool. The upper strap portion U is free to be manipulated. The combination tool 20 includes rigid base structure 21 presenting an elongated foot 21F for contact with the article to be tied. An upstanding gear housing 22, is incorporated in the base structure and tensioning facilities 23 of any conventional type are disposed along one side of the base structure. In the tensioning facilities illustrated herein, a pivot shaft 24 projects from the gear housing and carries an outboard link 25. A feed wheel shaft 26 projects from the gear housing and has its outer end journaled in the outboard link 25, with a release lever 27 being provided on the remote side of the gear housing 22 to control release of the feed wheel W in relation to a tensioning anvil 28 that is seated in the contact foot 21F.

An air motor 29 is mounted to project endwise from the gear housing and it conventionally may be configured to present a convenient handle for manipulating the tool. The air motor 29 has a flexible air line 29L supplying compressed air at a range of 80–100 p.s.i.g. A power cylinder 30 leads endwise in the opposite direction from the gear housing 22, and it includes integrally depending hollow wall structure 30W mounting a vertically slidable main pressure jaw 31 overlying and confronting a stationary pressure jaw or sealer anvil 32 provided on the contact foot 21F.

In the strap loop configuration illustrated in FIG. 4, the lower strap portion L seats in the tensioning anvil 28 to be gripped thereby and leads along the foot 21F to overlie the stationary lower pressure jaw 32 while the upper strap portion U is threaded into the tool in overlapping relation to the lower strap portion, to be contacted initially by the feed wheel W and later by the movable pressure jaw 31. The upper strap portion which may lead from a supply reel is firmly held by a clamping mechanism 33 carried on the outboard rod end of a ram like piston 34 that operates in the cylinder 30.

In the practice of the invention the loop of strap is formed loosely about the article as illustrated in FIG. 4 and the tool is applied sidewise over the overlapped strap portions U and L. At this point the positioning lever 27 is actuated to load the feed wheel W towards the tensioning anvil 28 for establishing gripping engagement with the overlapped strap portions. The air motor 29 is now actuated to drive the feed wheel W in a direction to draw tension on the loop to a predetermined value determined by the stall setting for the air motor. Now, the free length of the upper strap portion U is trained taut and then is firmly engaged in the clamping mechanism 33. A control button 35 associated with the air motor housing is actuated to apply air pressure for loading the movable main pressure jaw 31 downwardly, so that the corresponding regions of the strap portions U and L are compressed together, with each interface surface presented thereby, having frictional contact relative to the opposing interface surface. The typical value for the pressure is 5,000 p.s.i. though substantial variations of as much as 50 percent or more up or down from this figure can be employed. Shaping of the movable jaw 31 to proportion the area of the strap contact face of the movable jaw 31 as compared with the area of the upper end of the movable jaw enables establishment of the desired pressure value. The strap is now firmly held between the pressure jaws 31, 32 and the feed wheel release lever 27 is then shifted to elevate the feed wheel W so that the regions of strap portions U and L, adjacent the feed wheel W and tensioning anvil 28 are not restricted from movement.

Another control button 36 provided on the motor housing 29 is then actuated to apply a force against the piston 34. Release valve arrangements are currently available to enable the desired rapid dumping of compressed air into the cylinder 30 for thrusting the piston 34 and the clamping mechanism 33 from the full line to the dotted line position illustrated in FIG. 4. In this technique a force is applied to the upper strap portion U by the rapid movement of the clamping mechanism 33. This force may be applied to the strap at a location spaced as much as several inches from the main pressure jaws 31, 32, in which case due to the static friction acting upon the upper strap, movement does not occur instantaneously at the interface, but the strap elongates slightly, until such time as sufficient tension builds up to break static friction and enable rapid travel of the upper strap portion U between the jaw 31 and the stationary lower strap portion. The strap movement at the jaws may typically be ½ inch to ⅞ inch. There is thus produced a bodily sliding frictional movement with respect to the contacting interface surfaces of the strap portions U and L while the same are compressed between the main pressure jaws. This bodily sliding frictional movement produces heat distributed in accordance with the pressure distribution at the interface surfaces to effect substantially instantaneous surface melting of a limited depth region. It is to be noted that the bodily sliding strap travel draws the strap loop somewhat more tightly upon the package. This is feasible by limiting the tautness initially established by the air motor 29 acting through the feed wheel and also by the ability of the plastic strap to absorb the shock effect of the rapid strap movement. Upon termination of the strap movement, the melted surfaces fuse and solidify while the pressure jaws 31, 32 continue to act to compress these interface surfaces together. After solidification the jaws may be released from the strap and the tool removed.

It is more convenient to operate the tool in a relationship wherein the air motor stalls at a value somewhat short of the desired final ligature tension, with the subsequent frictional movement of the upper strap U being in a direction to further tension the loop. The reverse procedure is also contemplated wherein the impact travel is imparted to the strap end in a tension reducing direction. In either case, the practice of the invention permits a loop to be formed about the article and then to be drawn into article binding engagement, and a fusion seal established by effecting controlled bodily sliding frictional movement relative to the interface surface regions of the overlapping strap portions. It will be apparent that in this one-way movement mode, the instantaneously effective frictional area of one strap moving relative to the other is gradually changing. There is, therefore, a surface area exposed to friction during the stroke which is not embraced in the final joint area.

A combination manual tool is designated generally at 40 in FIG. 5a and again is shown seated upon an article A with the loop of strap S snugly encircling the article and having overlapping upper and lower strap portions U and L threaded through the tool. The upper strap U is again free to be manipulated. The manual combination tool 40 includes rigid base structure 41 presenting an elongated foot 41F for contact with the article to be tied. At one end, the base structure mounts a feed wheel W that overlies a base mounted anvil 42 and is to be ratcheted in a loop tensioning direction by repeated cranking of a tensioning handle 43. At the remote end, the base structure mounts a stationary rough surfaced lower jaw 44 and a movable rough surfaced upper jaw 45 which confronts the lower jaw and is actuated by control of a pressure lever 46 to establish these jaws in compressing engagement with overlapping strap portions after a strap loop has been drawn taut by the feed wheel W.

Finally, the base structure mounts a stationary sealer jaw 47 which may, though not necessarily, have a roughened contact face confronted by a movable sealer jaw 48 which is to be pressure loaded towards the stationary sealer jaw under the control of a lever mechanism (not shown) which may be of the same general type illustrated at 46 in relation to the jaws 44, 45. The movable sealer jaw 48 has a smooth strap contact face and it is to be loaded towards the lower sealer jaw to compress the strap portions under substantial pressure.

The tool embodiment shown in FIG. 5a produces a similar type of one-way controlled bodily sliding movement of the upper strap portion U. In the use of the tool, a strap loop S loosely encircles the article with its overlapping strap portions U and L ready to be threaded sideways into the tool. For this purpose, the sets of jaws 44, 45 and 47, 48 are open and the feed wheel W is elevated above the tensioning anvil 42 when the tool is initially applied. Thereafter, the tensioning handle 43 lowers the feed wheel and then is repeatedly swung to ratchet the feed wheel W and draw tension on the loop while both sets of jaws remain open to accommodate the desired tension travel of the strap. When the desired full strap tension is achieved, the lever 46 is actuated to engage the gripper jaws 44, 45 firmly with the overlapping strap portions, with loop tension thereafter being held by the jaws 44, 45 until the joint has been completely formed. The tensioning wheel W is now elevated to free the upper strap end so that a slack region R may manually be drawn up between the sets of jaws 44, 45 and 47, 48 as illustrated in FIG. 5b.

Thereafter, the sealer jaws 47, 48 are engaged (as shown in 5c) and the feed wheel W is lowered to reestablish driving engagement with the free upper strap portion. Further actuation of the tensioning handle 43 now draws tension on the strap section intermediate of the sealer jaws and the tensioning wheel, with static friction between the smooth faced movable sealer jaw 48 and the upper strap portion U initially holding the upper strap portion slack in the region between the sets of jaws (See FIG. 5c). Tension rapidly builds up due to the feed wheel movement, until this static friction effect is overcome, at which time the slack strap is rapidly drawn through the sealer jaws 47, 48 to effect interface melting (See FIG. 5d). The sealer jaws continue to act after completion of this controlled bodily sliding movement to produce solidification of the melted interface regions then disposed between the sealer jaws 47, 48.

A power operated equipment arrangement for producing a similar strap travel action is illustrated in FIG. 5e, wherein the apparatus includes a primary tensioner 50 and a secondary tensioner 51 flanking a pair of sealer jaws 47, 48. In this arrangement, the strap loop is threaded into the equipment and tension is drawn by rotating the feed wheels W of both tensioners 50, 51 in unison. The primary tensioner 50 has a feed wheel speed slightly greater than that of the secondary tensioner gradually to build up a predetermined slack region R between these feed wheels. The sealer jaws 47, 48 are open during the time tension is drawn and the slack region R is created. The sealer jaws 47, 48 then close and the secondary tensioner 51 is operated while tension is held on the loop by the primary tensioner 50.

Again tension builds up while static friction at the sealer jaws 47, 48 hold the upper strap stationary. Finally, static friction is overcome and the upper strap is drawn rapidly through the sealer jaws 47, 48 until the slack is used up. The action and the effect is thus seen to be similar to that described in relation to the embodiment of FIG. 5a.

Figure 7:
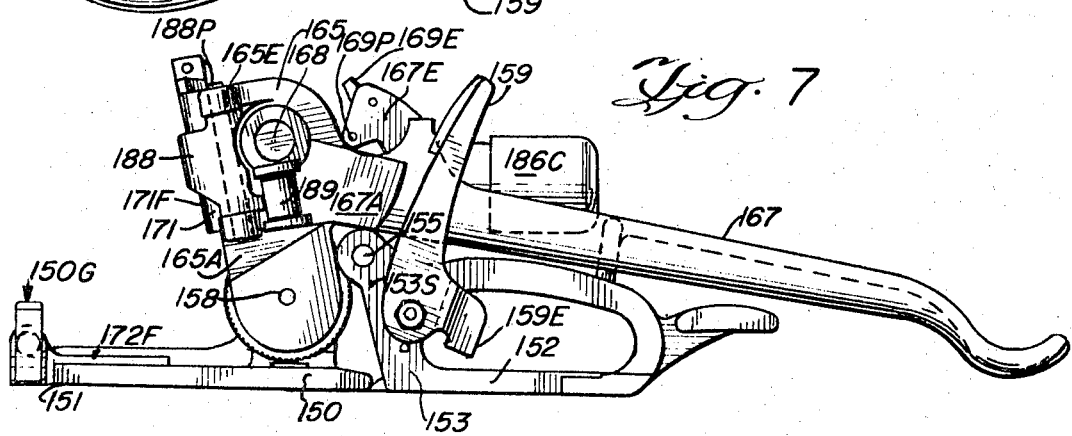
FIG. 7 is a side elevational view of the tool shown in FIG. 6.
Figure 8:
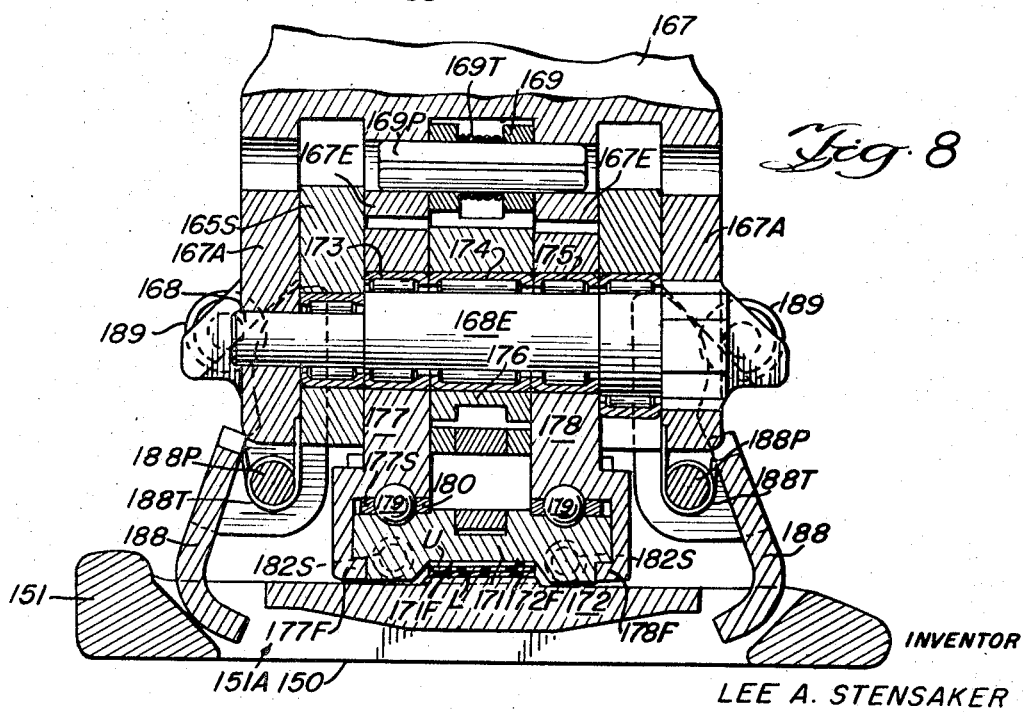
FIG. 8 is a fragmentary enlarged transverse sectional view through the sealer parts of the tool of FIGS. 6 and 7 when the sealer is in strap embracing relation upon the tool base.
Figure 9:
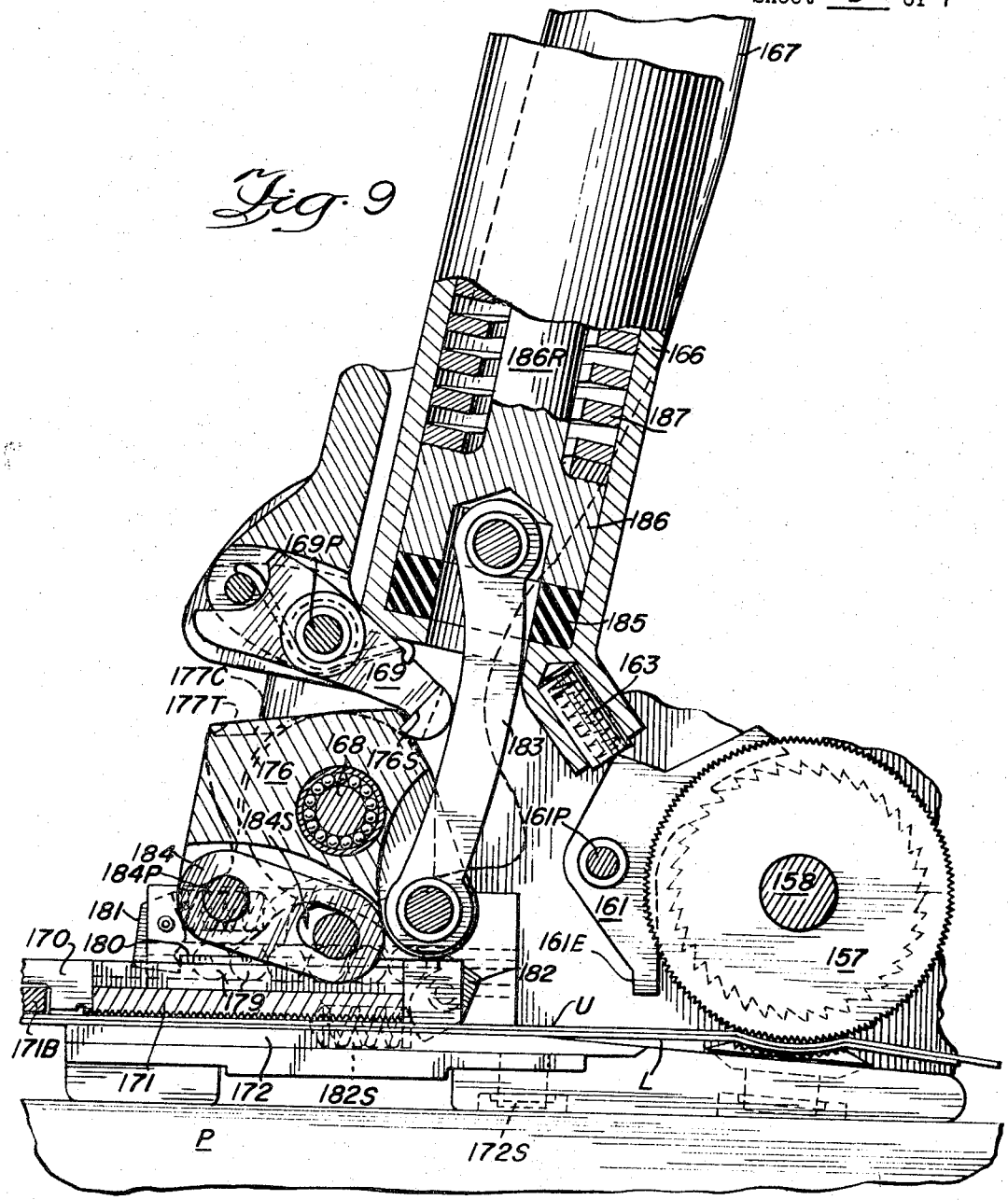
FIG. 9 is an enlarged lengthwise sectional view through the sealer showing the position of the parts after tensioning and prior to cocking of the actuator spring and retracting of the sealer shoe.

A manual tool embodiment utilizing the principles of this invention is illustrated in its entirety in FIGS. 6 and 7. This embodiment is the subject matter of the aforesaid Ericsson application and is included here as a further example of the concepts of the present invention. Fragmentary enlargements of this tool are illustrated in FIGS. 9 and 10 where the tool is represented seated upon a package P with a loop of strap S shown encircling the package and having upper and lower strap portions U and L threaded through the tool. The upper strap portion U again may lead from a suitable supply reel (not shown).

The main framing structure of the manual tool consists of a full length base 150 having a stationary main contact portion 151 widened and centrally apertured, as indicated at 151A, at the sealer end of the tool, a handle portion 152 at the opposite end and an intermediate cradle portion 153 joining the handle and main contact portions and including upstanding front and rear side walls 153S spaced apart to define a central chamber. In the complete views of FIGS. 6 and 7, the base 150 is shown mounting a front strap guide 150G to prevent the lower strap from shifting sidewise off the base at the time of loop slack take-up.

The tensioning or loop constricting facilities in the illustrated tool embodiment include a feed wheel carrier 154 (see FIG. 10) of generally U-shaped configuration that nests in the central chamber defined between the base side walls 153S. A mounting pin 155 spans the base side walls 153S and pivotally mounts the U-shaped carrier 154, with a heavy duty torsion spring 156 encircling the pin 155 and reacting between the base and the carrier 154 normally to urge the carrier 154 in a counterclockwise direction. A ratchet and feed wheel unit 157 is journaled on a shaft 158 that rides in the carrier. A manual lock lever 159 is connected to control the carrier 154 for holding the feed wheel adjacent a base mounted anvil 160 which may be in the form of an insert gripper plug. The lock lever 159 includes an extension 159E to serve as a rear strap guide.

To draw tension on the strap loop S, a pulling pawl 161 is mounted on a pin 161P carried by a sealer frame 162 that is swingably mounted on opposite ends of the feed wheel shaft 158. The pulling pawl 161 is normally biased into engagement with the ratchet and feed wheel unit 157 by means of a coil spring 163 carried in the sealer frame 162. When swinging movement is imparted to the sealer frame to repeatedly crank it between the FIG. 9 position and the FIG. 7 position, the pulling pawl 161 rotates the feed wheel to advance the outer strap portion U while the anvil 160 holds the lower strap portion L. Finally, a holding pawl 164 is journaled on a pivot pin 164P mounted on the carrier 154 to engage the ratchet and feed wheel unit 157 and prevent reverse rotation thereof. While a link-type feed wheel loading system is disclosed, an eccentric feed wheel system could also be utilized.

The sealer frame, as best seen in FIGS. 7 and 14, is swingably mounted from the feed wheel shaft 158 and carries the operating parts of the friction-fusion joint forming mechanism. The sealer frame 162, as illustrated in the isolated views of FIGS. 13 and 14, has a hollow head 165 and a spring housing 166 integrally projecting from the head and defining a spring chamber that communicates with the interior of the head. The head 165 is defined by flanking side walls 165S having correspondingly extending apertured arm portions 165A that are journaled on the feed wheel shaft 158.

A sealer handle 167 terminates in a forked connector end constituted by front and rear mounting arm portions 167A that have aligned openings to embrace the head 165 of the sealer frame and receive opposite ends of a sealer shaft 168 in rotatably driving relationship. The sealer shaft 168 projects crosswise through the center of the head 65 and is rotatable relative thereto. To accommodate the desired range of swinging movement of the sealer handle and the sealer shaft relative to the sealer frame 162, a central clearance aperture 167C is provided intermediately along the shank of the handle to receive the spring housing 166 of the sealer frame in nested relation (see FIG. 6). The sealer handle has an upwardly bowed portion 167B adjacent the clearance 167C to embrace the spring housing 166 when it nests within the clearance aperture 167C. This bowed portion carries a pair of ears 167E that are located in side by side spaced relation to receive and cooperatively support opposite ends of a mounting pin 169P. A handle pawl 169 is pivotally mounted on the pin 169P and is described in more detail hereinafter.

The friction-fusion forming facilities include a cutter 170 pivotally mounted in nested relation in a floatingly mounted movable pressure jaw 171 carried in the sealer frame to face through the open bottom of the sealer head 165 and cooperate with an anvil or stationary pressure jaw 172 that is nested within the base socket 151A provided in the contact foot portion. Anvil support pins 172P brazed into anvil 172 are secured by lock rings 172R to hold the anvil to base 151, as shown in FIG. 10. The contact face 172F presented by the sealer anvil is smooth at the end where the cutter operates and is roughened at the remaining region engaged by the inner strap portion L which is under full loop tension and not likely to shift. The roughened contact face 172F on the anvil is longer than the contact face 171F on the movable jaw 171 by an amount sufficient to accommodate the power stroke travel of the jaw 171. Thus, the jaw-contact face 171F terminates adjacent the line of action of the cutter 170. The jaw 171 has an integral cross bar 171B forwardly spaced from the main jaw face 171F, this bar presenting a separate strap contact face to generate friction heat in advance of this main jaw face 171F and thereby obtain fusion of the joint region up to the extreme forward end of the main face.

The cutter 170 is of inverted U-shaped outline and is mounted on a jaw pin 171P to straddle the integral cross bar 171B that spans an open central region (FIG. 12) at one end of the movable jaw 171. The cutter 170 presents a gauge face 170F to define a strap contact plane and the cutter carries a knife edge 170E projecting beyond that plane a distance corresponding to the thickness of the upper strap U. The cutter is thereby accurately gauged to the strap thickness so as to reliably cut the upper strap U without weakening the corresponding region of the lower strap L.

The sealer shaft 168 has an eccentric portion 168E rotatable within the sealer head 165 to operate the sealer parts in predetermined sequence under the control of the sealer handle 167. A set of three antifriction bearings 173, 174 and 175 ride on this eccentric shaft portion 168E, the center bearing 174 carrying a bell crank 176 and the flanking bearings carrying a pair of jaw or shoe supports 177, 178 that lie alongside the sealer head side walls 165S and present an upper edge contour 177C that terminates in a corner trip 177T (see FIGS. 9 and 11) to control release of the handle pawl 169 from the bell crank 176.

The eccentric portion 168E of the sealer shaft defines a common center for the principal sealer parts and facilitates the construction and mechanization of the sealer functions. The common center relationship provides a convenient mounting for the bell crank 176 and shoe supports 177, 178, simplifies strap compression by the movable jaw 171 and provides easy adaptation of the jaw face 171F to the elevation of the strap surface. Differing strap thickness and part variations introduce alignment problems which are obviated by the common center construction of this tool.

The supports 177, 178 also provide depending outboard arms terminating in inwardly directed flanges 177F and 178F to seat in bottom corner recesses of the movable jaw 171 and thereby support the jaw for sliding movement across the bottom face of the sealer frame. Each of the supports 177, 178 presents a downwardly facing shoulder 177S, 178S having a lengthwise groove mating with corresponding upwardly facing grooves 171G (FIG. 12) provided in the top of the movable jaw collectively to define parallel races each of which receives a set of ball bearings 179. A separate elongated ball retainer frame 180 is provided for each set of ball bearings 179 and is shiftably controlled to reset the balls for maintaining a stable pressure transmitting relation between the jaw 171 and the supports 177, 178 during repeated sliding operations of the movable jaw. For this purpose, each of the supports 177, 178 carries a separate pivotally mounted control link 181 normally acted upon by individual bias springs 181S carried endwise in each support and the jaw 171 pivotally mounts a pair of control links 182 normally acted upon by individual bias springs 182S carried endwise in the shoe. These control links 181, 182 have endwise engagement with the ball retainer frames 180 to recenter the frames and the balls after each stroke for enabling pressure to be applied in a balanced antifriction relationship.

The sealer handle 167 carries the handle pawl 169 for swinging movement about the axis of the sealer shaft 168. A torsion spring 169T encircles the mounting pin 169P for the handle pawl 169 and normally biases the handle pawl in a clockwise direction as viewed in FIGS. 9 and 10, to engage a peripheral shoulder 176S presented by the bellcrank 176. The bellcrank has a first bifurcated corner providing ears 176A apertured to receive a pivot pin 183P for a connecting rod 183 and has a second bifurcated corner providing ears 176B to receive a pivot pin 184P for an impact link 184. The impact link 184 is connected in lost-motion relation to the movable jaw 171 by means of a drive pin 171D carried between upstanding flanking ears 171E (FIG. 12) integrally formed on the jaw, with the drive pin 171D being engaged in an elongated slot 184S provided in the impact link. The lost-motion connection of the link 184 to the jaw 171 creates an impact effect aiding initial acceleration of the jaw 171. If no impact effect were required (either due to greater spring pressure or to lower friction strap) the bellcrank could have a pinion form to engage a rack on the jaw 171. The connector rod 183 leads through an annular cushion 185 seated in the base of the spring chamber and is swively connected to the head end of a movable spring seat 186 slidable in the spring housing 166 and including a central guide rod 186R projecting through a high strength main spring 187. The opposite end of the spring is seated against head cap 186C at the top of the spring housing (see FIGS. 6 and 7).

When the sealed shaft is rotated by swinging the sealer handle 167 from the FIG. 9 position toward the FIG. 10 position, the bellcrank 176 and the supports 177, 178 are forced down by the eccentric shaft portion 168E to lower and impress the jaw upon the overlaping strap portions which overlie the stationary pressure jaw presented by the anvil 172. Lifting reaction against the frame associated with this strap compression is taken by a pair of reaction jaws 188. During rotation of the sealer handle 167 from the FIG. 9 position towards the FIG. 10 position, the bellcrank is rotated counterclockwise under the control of the handle pawl 169 which engages the bellcrank shoulder 176S.

Counterclockwise rotation of the bellcrank 176 lifts the connector rod 183 and the spring seat 186 for compressing the main spring 187. Simultaneously, the drive link 184 carried by the bellcrank 176 retracts the movable jaw 171 to draw the outer strap portion U into a slack relationship. The spring 187 is substantially fully compressed, and the jaw is substantially fully retracted when the sealer handle reaches the intermediate position represented in FIG. 10. The center line of action of the spring 187 is related to the eccentric shaft portion 168E to provide an increasing mechanical advantage with increasing spring compression. The particular arrangement disclosed is such that handle effort actually decreases at this stage.

Upon further rotation of the sealer handle 167, the handle pawl 169 rides onto an abutment in the form of corner trips 177T provided integrally on the supports 177, 178 and lifts off the bellcrank shoulder 176S to free the bellcrank. The full cocked main spring 187 immediately drives the bellcrank clockwise for powering the movable jaw 171 through a rapid friction stroke. This reverse rotation of the bellcrank 176 brings an integral corner cam 176C (FIG. 10) into play to pick the handle pawl 169 free and enable continued movement of the sealer handle 167. By this time, however, the power stroke travel is completed. The action is so rapid that a normal handle stroke, while interrupted briefly, continues as if automatic.

After completion of the friction stroke, the movable jaw 171 holds pressure on the strap portions U and L until interface fusion and solidification is effected. The cutter 170 which rides on the shoe 171 is now outboard of the sealer head 165. During this cooling interval, the continued movement of the sealer handle 167 brings a handle pawl extension 169E against the shoe to drive the cutter knife edge 170E through the upper strap portion U immediately adjacent the joint, the cutting stroke being limited by contact of the gauge face 170F against the upper strap. The preheat effect associated with the bar 171B enables joint fusion up to the extremity of the jaw 171 so that strap cutoff is substantially exactly at the joint edge.

During the friction stroke, the sealer handle 167 is in a position wherein the eccentric shaft 168 exerts a maximum and substantially uniform pressure through the supports 177, 178 and against the jaw 171. The balls 179 enable antifriction movement of the pressure loaded jaw 171 and are important in enabling the spring 187 to produce an effective power stroke.

It is necessary to lock the sealer frame in its down position to enable pressure to be exerted through the jaw 171 upon the overlapping strap portions that rest upon the sealer anvil 172. For this purpose, the reaction jaws 188 are swingably mounted on pivot pins 188P carried by fore and aft spaced outboard ears 165E integrally carried alongside the sealer head 165. The sealer handle 167 has its side arms 167A provided with outboard ears to carry a rotatably mounted cam roller 189. The relationship of the sealer handle 167 to the sealer head 165 is such that the cam roller 189 holds the reaction jaws 188 in flared relation during tensioning and during initial handle rotation following seating of the sealer frame 162 upon the base 151. Thereafter, rotation of the sealer handle 167 towards the FIG. 10 position, and while the sealer frame is stationary, lifts the cam rollers 189 to free the jaws 188. Torsion springs 188T associated with each jaw pin 188P then swing each jaw beneath the corresponding lateral edge of the sealer anvil 172. Further rotation of the sealer handle 167 to bring the eccentric shaft portion 168E into pressure applying relation is carried out while the reaction jaws 188 are locked beneath the anvil.

In the particular manual tool arrangement disclosed herein, a maximum spring force of 250 pounds is employed and the travel stroke is about ⅞ of an inch in the presence of load pressure of about 1500 p.s.i. at the contact face 171F of the jaw. The contact face 171F presented by the jaw is ½ inch by 1⅝ inches to achieve a joint area of about 1⅝ x ½ and a joint strength of 300–400 pounds. These relationships enable a short base tool construction and it should be noted that the joint strength is not significantly improved by increasing the length of the pressure face or by increasing the pressure or the spring force. A tool utilizing these values for stroke length, pressure and joint length may conveniently be constructed with a sealer handle 10 inches long and requiring a hand force of 10 to 15 pounds for cocking the spring.

Operation of the manual tool through a complete tensioning and sealing cycle may now be described. The tool is swung to the open position which is illustrated in FIGS. 6 and 7 to receive the overlapping upper and lower strap portions U and L after the strap has been formed into a loop about the article A. The sealer handle 167 is then repeatedly cranked through a range of swingings movement between the FIG. 7 position and the FIG. 9 position to ratchet the feed wheel unit 157 and pull tension on the strap loop. During this range of swinging movement, the sealer handle 167 and the sealer frame 162 move in unison about the axis of the floatingly mounted feed wheel shaft wheel 158, with the tensioning pawl 161 and holding pawl 164 repeatedly engaging, advancing and holding the feed wheel. During the tensioning cycle, the sealer parts which are carried in the sealer frame are free of the strap.

When desired tension is achieved, the sealer handle 167 is moved to the FIG. 9 position to seat the sealer frame 162 in straddling relation upon the outer and inner strap portions U and L that overlie the stationary sealer jaw 172. At this point, the rotary position of the sealer shaft 168 is such that the supports 177, 178 hold the movable sealer jaw at a minimum pressure relation with respect to the strap. Initial swinging movement of the handle 167 with respect to the sealer frame 162 releases the cam roller 189 and enables the reaction jaws 188 to swing beneath the stationary sealer jaw 172 to take the reaction that develops as the movable jaw or shoe 171 is impressed upon the strap. Upon further rotation of the sealer handle 167 towards the FIG. 10 position, the sealer shaft rotates to lower the supports 177, 178 and pressure load the movable jaw 171 onto the strap.

The swinging movement of the sealer handle also causes the handle pawl 169 to rotate the bellcrank 176 for cocking the main spring 187 and retracting the movable sealer jaw 171. Retraction of the jaw is accompanied by gradually increasing pressure of the jaw against the outer strap section U, enabling this outer strap section to be drawn slack. The cutter 170 which nests in the movable sealer jaw 171 rides with it but is inactive at this point of the cycle. Retraction of the jaw 171 kicks the tensioning pawl extension 161E to disengage the tensioning pawl, with the spring 163 holding the same disengaged, to enable return of the sealer handle after joint formation, without producing strap tensioning movement of the feed wheel.

When the swinging movement of the sealer handle brings the bellcrank 176 to and beyond the FIG. 10 position, the handle pawl 169 begins to lift free of the bellcrank as it rides onto the corner trips 177T, 178T provided on the supports 177, 178. At this point, substantially maximum pressure is being applied to the strap by the movable jaw and the spring 187 fires to power the jaw 171 through a rapid one way travel stroke to effect bodily sliding frictional movement of the outer strap portion against the inner strap portion sufficient to achieve interface melting between the frictionally contacting strap surfaces. The sealer jaws 171 and 172 continue to act on the stationary strap portions to effect solidification of the melted surface regions that are held in stationary broad area fusing contact.

The power stroke of the shoe 171 returns it to a position such as is illustrated in FIG. 9 wherein the cutter 170 is exposed. The swinging movement of the handle 167 is continued beyond its FIG. 10 position after the movable jaw 171 has completed its power stroke. Further movement of the sealer handle brings it into camming engagement with the exposed cutter 170 to sever the outer strap section closely adjacent the fused joint.

The sealer handle and the sealer frame are now swung to the position illustrated in FIG. 7 to release the tool from the completed strap loop. During this return movement, the tensioning pawl is inactive but at the end of such movement, the pawl engagement is reestablished, when the tip of the pawl 161 strikes the spring 156. Correspondingly, a cam shoulder 190 disengages the holding pawl 164 to free the feed wheel to release the strap.

Thus, while preferred constructional features of the invention are embodied in the structure illustrated herein, it is to be understood that changes and variations may be made by those skilled in the art without departing from the spirit and scope of the appended claims.

What is claimed is:

1. A process for providing and securing a ligature about an article, comprising providing a length of thermoplastic strap and forming the strap into a tensioned loop around the article so that the strap is provided with overlapping strap portions, compressing said overlapping strap portions to place contacting surface regions thereof in frictional engagement, causing bodily sliding frictional movement between the contacting surface regions of said compressed overlapping strap portions until interface melting occurs while maintaining said tensioned loop around the article and while retaining said overlapping strap portions compressed, and thereafter terminating said bodily sliding frictional movement, whereby said melted surface regions fuse to achieve interface solidification between the overlapping strap portions.

2. A process as set forth in claim 1 wherein said movement causing step is performed by causing relative longitudinal sliding frictional movement between said contacting surface regions.

3. A process as set forth in claim 1 including the further step of maintaining said melted surface regions free of tension from the loop until interface solidification is achieved.

4. A process as set forth in claim 1 wherein said movement causing step is performed by holding one strap portion stationary and moving the other strap portion unidirectionally in a lengthwise loop direction.

5. A process as set forth in claim 1 in which said strap portion compressing step is performed by providing a pair of spaced pressure jaws and moving one of the pressure jaws relative to the other pressure jaw into clamping engagement with the overlapping strap portions to place the contacting surface regions thereof in frictional engagement, and wherein said movement causing step is performed by holding the pressure jaws in clamping engagement with the strap portions and drawing one of said strap portions unidirectionally in a lengthwise loop direction to move said one strap portion relative to said other strap portion and relative to said clamping jaws.

6. Strapping apparatus for securing a ligature about an article, which ligature is made of a length of thermoplastic strap formed into a loop having overlapping end portions, comprising means for withdrawing one of the end portions to constrict the loop about the article and to place the loop in tension, means for compressing said overlapping strap portions to place opposing surface regions thereof in frictional engagement, and joint forming means for friction-fusing said opposing surface regions, said point forming means including means for producing bodily sliding frictional movement between said opposing surface regions to effect interface melting therebetween, whereby said melted surface regions fuse to achieve interface solidification between the overlapping surface regions.

7. Apparatus as set forth in claim 6 wherein said means for producing bodily sliding frictional movement includes a strap gripping member movable into engagement with one of the overlapping end portions of said loop, and means for moving said strap gripping member unidirectionally in a lengthwise loop direction.

8. Apparatus as set forth in claim 6 wherein said means for compressing said overlapping strap portions includes a pair of confronting pressure jaws, and means for moving at least one of said pressure jaws into strap compressing relationship with respect to the other pressure jaw.

9. Apparatus as set forth in claim 8 wherein said means for producing bodily sliding frictional movement includes drive means for moving said one pressure jaw unidirectionally in a lengthwise loop direction.

10. Apparatus for providing a ligature in binding engagement about an article by tensioning and sealing a thermoplastic strap disposed in a strap loop encircling the article and having outer and inner overlapping strap portions, said apparatus including a main frame having base structure to engage the article adjacent the overlapping strap portions, tensioning mechanism mounted from the main frame and including an anvil carried on the main frame and engageable stationarily with a first region of the inner strap portion and a wheel rotatably carried on the main frame and engageable with an overlying region of the outer strap portion to draw tension on said loop and establish the loop in article binding engagement, sealing mechanism mounted from the main frame and spaced from the tensioning mechanism along a lengthwise loop direction and having first jaw means engageable with a second region of said inner strap portion and having second jaw means confronting said first jaw means and engageable with an overlying region of the outer strap portion, pressure means for compression loading said first and second jaw means against said strap portions for independently holding the loop in article binding engagement, clamp means shiftably carried from said main frame and engageable to grip one of said strap sections at a region spaced from said sealing mechanism, and drive means operable before release of said pressure means and connected for shifting said clamp means unidirectionally in a direction to produce limited unidirectional bodily sliding movement between said overlapping strap portions to melt opposing interface regions thereof and enable subsequent stationary compression of such melted interface regions to fuse and unify the overlapping strap portions.

References Cited

UNITED STATES PATENTS

| | | | |
|---|---|---|---|
| 2,741,885 | 4/1956 | Allison | 53—198 |
| 2,982,069 | 5/1961 | England | 53—198 |
| 3,126,680 | 3/1964 | Baird et al. | 53—3 |
| 3,184,354 | 5/1965 | Strother | 156—73 |
| 3,269,300 | 8/1966 | Billett et al. | 100—8 |

FOREIGN PATENTS

| | | |
|---|---|---|
| 1,014,988 | 12/1965 | Great Britain. |
| 149,296 | 10/1960 | Russia. |

OTHER REFERENCES

Freres, Robert N.: Fabrication with Friction Heat in Modern Plastics, November 1945, pp. 142–145.

EARL M. BERGERT, *Primary Examiner.*

D. J. FRITSCH, *Assistant Examiner.*

U.S. Cl. X.R.

53—3, 39, 198; 100—2, 29, 33; 156—580; 217—66